United States Patent [19]

Tanaka

[11] 3,942,397
[45] Mar. 9, 1976

[54] WIRE STRIPPER

[75] Inventor: Minoru Tanaka, Higashi-Osaka, Japan

[73] Assignee: Hanazono Kogu Kabushiki Kaisha, Osaka, Japan

[22] Filed: Feb. 7, 1974

[21] Appl. No.: 440,477

[30] Foreign Application Priority Data
Feb. 7, 1973    Japan.............................. 48-16306

[52] U.S. Cl.............................................. 81/9.5 A
[51] Int. Cl.² ......................................... H02G 1/12
[58] Field of Search................ 81/9.5 R, 9.5 A, 9.51

[56] References Cited
UNITED STATES PATENTS

| | | | |
|---|---|---|---|
| 1,314,759 | 9/1919 | Silvernail............................ | 81/95 B |
| 1,673,196 | 6/1928 | Johnson et al....................... | 81/9.51 |
| 1,902,742 | 3/1933 | Wentink .............................. | 81/9.51 |
| 2,563,911 | 8/1951 | Breck................................... | 81/9.51 |

Primary Examiner—Harold D. Whitehead
Assistant Examiner—Roscoe V. Parker
Attorney, Agent, or Firm—Armstrong, Nikaido & Wegner

[57] ABSTRACT

A stripper for stripping covering from covered wire comprising a cutter head including a front plate formed with at least one inserting bore for passing the covered wire; a pair of cutter members having cutter edges behind the inserting bore and arranged in the cutter head symmetrically on the opposite sides of the covered wire to be inserted therein, the pair of cutter members being pivotally movable and openable from aligned position toward the direction of insertion of the wire; and a spring member retained on and interconnecting the pair of cutter members to render the cutter members pivotally movable along paths symmetrical with respect to the wire and to urge the cutter members in closing direction when they are moved pivotally backward in the closing direction. The stripper further includes work members for gripping the wire forwardly of the cutter members with a force increasing with the increase in stripping resistance, the work members being movable away from the cutter members to pull the wire in operative relation to pivotal returning movement of the cutter members.

5 Claims, 11 Drawing Figures

WIRE STRIPPER

BACKGROUND OF THE INVENTION

The present invention relates to a stripper for removing a portion of covering from the end of covered electric wire, more particularly to improvements in the hand-operated stripper for stripping the ends of electric wires ranging from covered wires such as polyvinyl chloride wires having small diameters and used only as lead wires to those having large diameters such as cabtyre cords insulated with polyvinyl chloride.

To connect together covered electric wires such as cabtyre cords having a large diameter, it is generally necessary to remove a portion of insulation covering the conductor and a part of sheath covering the insulation in a stepwise fashion or individually. Thus a desired length of wire is stripped by cutting the sheath to remove the sheath first and then the insulation of rubber, vinyl chloride or the like is incised and removed to expose part of the conductor. Conventionally, such stripping work is usually done by cutting the covering with a knife or nipper little by little, this resulting in low efficiency and an unsightly cut end and making it very likely that the conductor itself will be damaged and cut. Accordingly, the work requires much experience. To overcome such drawbacks, stripping tools have already been provided and put to use as disclosed in U.S. Pat. Nos. 3,516,307, 3,515,018, 3,538,796, etc. However, these known devices include many parts to be adjusted and are complex in construction and difficult to handle in the wiring site. In fact, in the case where a major portion of covered wire is embbeded for example in the wall with only a part thereof left exposed therefrom for stripping, it is substantiallly difficult to strip the short exposed portion. Although the conventional devices may be adapted to strip covered wires of a small diameter such as polyvinyl chloride wire, it is impossible for them to strip a cabtyre cord or like covered wire of a large diameter. Moreover, many of them are expensive to make and prone to failures.

SUMMARY OF THE INVENTION

An object of this invention is to overcome the foregoing drawbacks of the conventional construction by employing a specially designed mechanism for supporting a cutter to make an incision in the insultion of covered wires and to thereby provide a novel and improved stripper which is inexpensive and easy to use.

Another object of this invention is to provide a stripper wherein a pair of cutter members are pivotally movable to a stripping position axially of the wire to be stripped so as to support the wire therebetween, the pair of the cutter members being adapted to be maintained in this position automatically and elastically while being held opened to a specified extent against possible deviation, the construction further being such that when the wire or stripper is pulled the pair of cutter members are returnable pivotally axially of the wire while progressively wedging their way into the covering of the wire so as to complete the wedging action when the cutter members are finally brought into alignment with each other, the cutter members thus assuring an effective pulling action in the course of the movement described.

Another object of this invention is to provide an improved novel stripper which permits the covering on the wire to have a neat end when the severed portion thereof is removed therefrom and which will not damage and accidentally cut the conductor.

Another object of this invention is to provide a stripper having a pair of gripping jaws disposed in front of the cutter members to grip the wire and movable forward away from the cutter members while gripping the wire with a force increasing with the increase in stripping resistance when a gripping lever is grasped and to thereby make it sure that the wire will be stripped by manipulating the stripper with one hand.

Another object of this invention is to provide a stripper wherein the covered wire can be released from the gripping jaws automatically after the covering has been cut by the cutter members completely.

Another object of this invention is to provide a stripper including adjusting means for preventing slippage of the gripping jaws when the jaws move forward away from the cutter members in gripping engagement with the wire.

Still another object of this invention is to provide a stipper which is so adapted that when the covered wire is to be stripped to expose a desired length of the conductor, the length of the conductor to be exposed can be determined with the eyes and which can be used by anybody with ease and without much experience.

The stripper of this invention includes in its cutter head a pair of cutter members in the form of blades pivotally movable axially of a covered wire to be stripped and disposed symmetrically on the opposite sides of the wire. The cutter members are in alignment with each other before use but are opened to a given angle by the wire to be stripped when it is placed in between the edges of the cutter members or by manipulation with the finger of user. To assure that the blade-like cutter members will be opened correctly to a specified extent, the pair of cutter members are provided with a coiled spring or like spring member. Accordingly, the cutter members are opened against the spring member to permit the covered wire to be placed in between the cutter members. The pair of cutter members, as opened to the specified extent, are held in elastic contact with the covered wire by the spring member. The cutter members are pivotally moved open in the direction of insertion of the wire. The pair of cutter members are ready for stripping operation when opened to the specified extent with their edges in engagement with the covered wire. The covered wire in front of the cutter members or the stripper main body is then pulled away from each other, whereby the cutter members are pivotally returned in the closing direction while wedging their edges progressively into the covering, the arrangement being such that when both the cutter members are restored into alignment with each other the covering will be completely cut. In the course of wedging of the cutter edges, the spring member retained on and interconnecting the cutter members acts to keep the edges in correct position against deviation and adds to the pulling force (operating force) during stripping.

According to this invention, the stripper is further provided, on the side wall of the cutter head, with a pair of sliders having gripping jaws positioned in front of the cutter members and movable away from the cutter members. The gripping jaws of the sliders opposing each other permit the wire to pass therebetween at first and thereafter pull the wire, firmly gripping the wire with an increasing force as they are moved away from the cutter members by manipulating a gripping lever.

The gripping jaws are returnable to the original position automatically when the gripping lever is released. The movement of the jaws away from the cutter members takes place in sliding fashion substantially axially of the covered wire. Accordingly, the gripping jaws are supported on the cutter head along with the sliding movement guiding members.

After the cutter members have been made ready for stripping action with their edges elastically engaging the covered wire therebetween, the gripping jaws grip the covered wire at a position in front of the cutter members, the construction being so designed that when the gripping lever is grasped, the gripping jaws move forward away from the cutter members, gripping the covered wire and thereby causing the cutter members to pivotally move backward in the direction of movement of the jaws, with their edges wedging their way progressively into the covering. As the edges are forced into the covering progressively, stripping resistance increases, so that it is desired for the gripping jaws to grip the wire with an increasing force. To this end, the mechanism for slidingly move the sliders having the jaws includes cam means to progressively reduce the space between the opposing jaws as the jaws move forward. The cam means comprises a cam groove formed in each of the sliders and a guide member in contact with the cam surface of the cam groove.

The cam means is so constructed that when the cutter members are brought back into alignment with each other and the covering is thereby completely cut with the cutter edges, the covered wire will be freed from the gripping engagement with the jaws instantaneously and automatically. Subsequently, the stripper main body is pulled away from the covered wire, whereby the severed portion of covering is stripped off the wire, with its cut end supported by the back of the cutter members.

To assure smooth operation, a stationary grip extends rearward from the cutter head including therein the pivotal cutter members described. The front wall of the cutter head is formed with wire inserting bores in conformity with the size of the covered wire to be stripped. The cutter members are disposed behind the inserting bores. To strip the covered wire in stepwise fashion, the wire inserting bores are plural in number and the cutter edges are positioned substantially behind the bores. The stationary grip is U-shaped in cross section and marked with a scale along its opening. The aforementioned gripping lever, when grasped, is pushed toward the stationary grip against a return spring.

The above and other objects, features and advantages of this invention will become more apparent from the following description with reference to the accompanying drawings showing the invention embodied as a stripper for vinyl chloride cabtyre cord for illustrative purposes only.

DESCRIPTION OF THE PREFERRED EMBODIMENT

Figure 4:
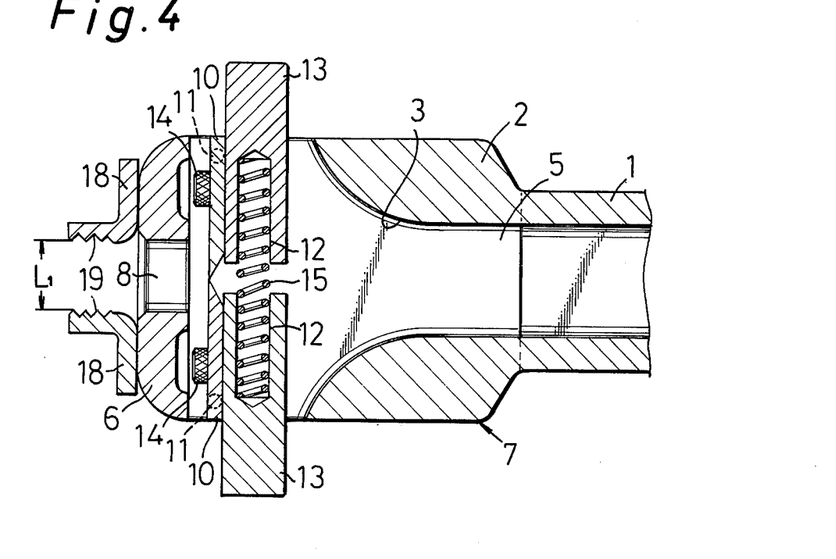
FIGS. 4 and 5 are views in section taken along the line IV—IV and the line V—V in FIG. 3 respectively, FIG. 4 showing the arrangement of cutter members in a cutter head, FIG. 5 showing a mechanism included in the cutter head to slide gripping jaws.

With reference to FIGS. 1 to 4, a stationary grip 1, U-shaped in cross section, has a head 2 projecting at its opposite sides. As seen in FIG. 4, the opposing inner side walls of the head 2 flare as at 3 and 3. The head 2 is provided on its top and bottom with upper and lower plates 4 and 5 projecting forward to support a front plate 6 between their free ends. The front plate 6 is positioned some distance forward from the front end of the head 2. The front plate 6, upper and lower plates 4 and 5 and head 2 form a cutter head 7 in the shape of a quadratic prism having an interior space.

The front plate 6 is formed with wire inserting bores 8 and 9 arranged in vertical alignment and having an elongated circular shape. The bore 8 is in conformity with the outer shape of the sheath of wire, whilst the bore 9 is in conformity with the inner configuration of the sheath. As will become apparent from the description given later, the sheath of wire will be removed when the wire is inserted into the bore 8, and the bore 9 receives the wire when removing the insulation of wire.

Disposed in the rear of the front plate 6 are a pair of bladelike cutter members 10 and 10 which are positioned symmetrically on the opposite sides of axes of the bores 8 and 9. The cutter members 10 and 10, pivotally supported as at 11 and 11 by the upper and lower plates 4 and 5, are pivotally movable about the pivots 11 and 11. When in alignment with each other as seen in FIG. 4, the cutter members 10 and 10 have their sheath removing edges 10a and insulation removing edges 10b positioned behind the bores 8 and 9 respectively. The space defined by the edges 10a is in conformity with the external shape of the insulation, while the spaces defined by the edges 10b correspond to the conductors as arranged in the wire, the embodiment shown in the drawings being adapted to strip a vinyl chloride cabtyre cord including three conductors arranged in parallel. At a position between the edges 10a and edges 10b, holder blocks 13 and 13 are secured to the rear surfaces of the cutter members 10 and 10 respectively by screws 14 screwed through these members from their front surfaces, the holder blocks 13 and 13 being arranged symmetrically and having spring holding cavities 12 and 12 opposing each other. As shown in detail in FIG. 4, a spring member 15 in the form of a coiled spring is received in the cavities 12 and 12 in slightly compressed state. The holder blocks 13 and 13 are partially exposed from the opposite sides of the cutter head 7. Accordingly, if one of the holder blocks 13 and 13 is pushed forward as by a finger, the pair of cutter members 10 and 10 will be pivotally moved about the pivots 11 and 11 against the spring member 15. The pivotal movement of the cutter members is limited by the contact of the holder blocks 13 and 13 with the flaring walls 3 and 3 (see FIG. 7(I)).

Figure 7:
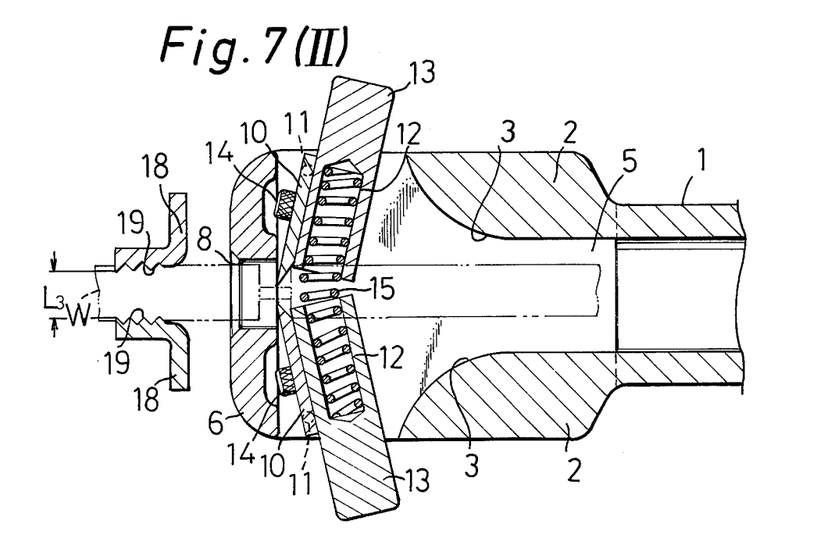
Figure 7I:
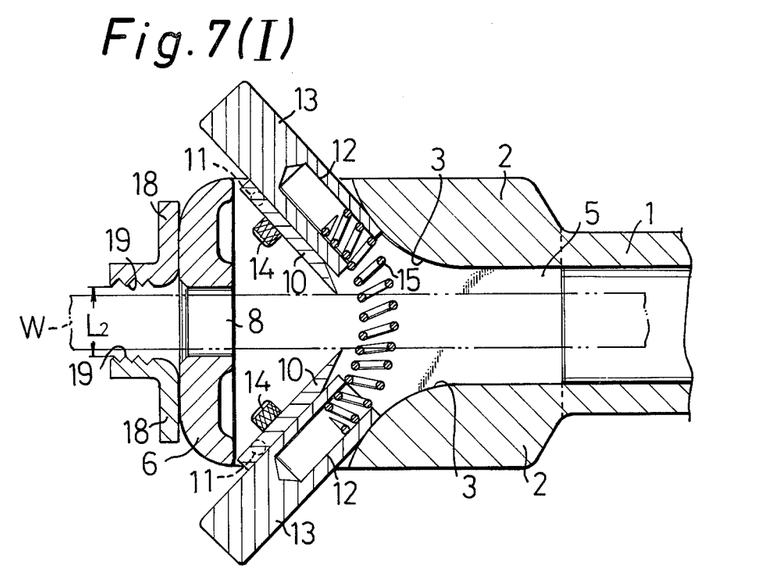
FIGS. 7(I) and (II) are sectional views showing the cutter members as ready for stripping action and after they have been moved to completely cut the covering of wire.

The cutter members 10 and 10, as positioned in FIG. 7(I), are ready for stripping operation. The spring member 15 assures that the cutter members 10 and 10 will be brought to this position with the edges 10a and 10b following the correct paths of movement thereof, symmetrically of the axes of the inserting bores 8 and 9 without deviation.

Thus when the cutter members 10 and 10 are brought to the stripping position with the covered wire W passed through the bore 8 and located between the members 10 and 10 and the holder block 13 is then relieved of the forward pressure, the edges 10a and 10a of the pair of cutter members come into elastic contact with the outer peripheral surface of sheath of the wire W, the cutter members thereby being located symmetrically of the wire W in gripping engagement therewith. Of course if the wire W inserted into the bore 8 is rigid enough to overcome the spring member 15 to push open the pair of cutter members 10 and 10, the wire W need only be placed in through the bore 8 to bring the cutter members 10 and 10 to the stripping position as seen in FIG. 7(I), without the necessity to push the holder block 13 with the finger. To remove the sheath from the covered wire W such as cabtyre cord as illustrated, the cutter members 10 will be brought to the stripping position only by the insertion of the wire W into the bore 8, whilst the holder block 13 may preferably be pushed forward when the wire W already stripped of the sheath is to be inserted in through the bore 9 to remove the insulation. The construction that the cutter members 10 and 10 can be opened by manipulating one of the holder blocks 13 and 13 is advantageous to adjust the amount of insertion of the covered wire namely the length of covering to be removed, when the wire W has been inserted into the stripper to excess.

The sheath will be removed in the following manner by the cutter members 10 and 10 in the position of FIG. 7(I). One of the covered wire W and the stationary grip 1 is pulled away from the other, whereby the cutter edges 10a and 10a in elastic contact with the outer peripheral surface of the sheath are forced into the sheath progressively to make an incision therein.

Thus the pair of cutter members 10 and 10 are pivotally moved backward about the pivots 11 and 11 in the opposite direction to the direction of insertion of the covered wire W while the cutter edges 10a and 10a are being prevented from deviation by the spring member 15. Further during the backward movement of the cutter members, the spring member 15 adds to the stripping force acting on the sheath.

More specifically, when the cutter members 10 and 10 in the position of FIG. 4 are brought to the position shown in FIG. 7(I), the spring member 15 as retained in the spring holding cavities 12 and 12 is slightly displaced in the cavities and exerts its restoring spring force on the cutter members 10 and 10 in the direction to close these members. Consequently, if one of the covered wire W and stationary grip 1 is moved away from each other, the cutter edges 10a and 10a gradually wedge their way into the sheath with the backward pivotal movement of the cutter members 10 and 10 in the closing direction. In the course of this movement, the restoring force of the spring member 15 adds to the pulling force, making it possible to effect stripping operation with a smaller force.

The cutter members 10 and 10 are returned to the position of FIG. 4 in alignment with each other, whereupon the end portion of the sheath is cut off by the cutter edges 10a and 10a which have been progressively forced into the sheath.

The stripping operation further proceeds to pivotally move the cutter members 10 and 10 slightly to the position shown in FIG. 7(II), permitting the severed piece of sheath to be supported by the back surfaces of thick portions of the cutter members adjacent their edges 10a and 10a. The support for the severed piece of sheath is given substantially by the bearing contact of the heads of screws 14 with the rear surface of the front plate 6.

The slight pivotal movement of the pair of cutter members 10 and 10 in the direction opposite to the direction of insertion of the wire as illustrated in FIG. 7(II) serves to prevent the severed sheath removing force from acting directly on the cutter members 10 and 10 but permits a component of the force to act thereon, thereby mitigating fatigue of the cutter edges 10a and 10a. More specifically, when the stationary grip 1 or the wire W is moved away from each other after the desired length of sheath has been cut off by the cutter edges 10a and 10a, there is produced a frictional force between the length of severed sheath and the insulation which frictional force will mainly act on the front plate 6 through the cutter members 10 and 10. If the cutter members 10 and 10 are inclined as seen FIG. 7(II), the frictional force, namely the force to withdraw the length of severed sheath, will act in such manner that only a component thereof acts on the cutter members 10 and 10. This serves to prevent fatigue of the cutter edges 10a and 10a.

With the stripper of this invention, stripping resistance will increase as the pair of cutter edges 10a and 10a wedge their way into the sheath progressively. Accordingly, the stripper includes means movable away from the cutter members 10 and 10 while gripping the wire W at a position forward of the cutter members with a force increasing with the increase in the stripping resistance as will be described below.

The upper plate 4 is centrally formed with a cut-away guide groove 4a extending from its rear end to a front portion thereof. Mounted on the upper plate 4 are a pair of opposing sliders 16 and 16, on which is positioned a lever guide plate 17. The lever guide plate 17 is formed with a guide groove 17a identical in shape to the guide groove 4a of the upper plate 4.

The front ends of the sliders 16 and 16 are bent downward as at 18 and 18 to provide gripping jaws 19 and 19, respectively, which project forward and which have toothed surfaces opposing each other so as to grip the covered wire W forwardly of the inserting bore 8. Before gripping the wire W, the opposing jaws are spaced apart by a distance $L_1$, permitting the wire W to pass therebetween.

Figure 5:
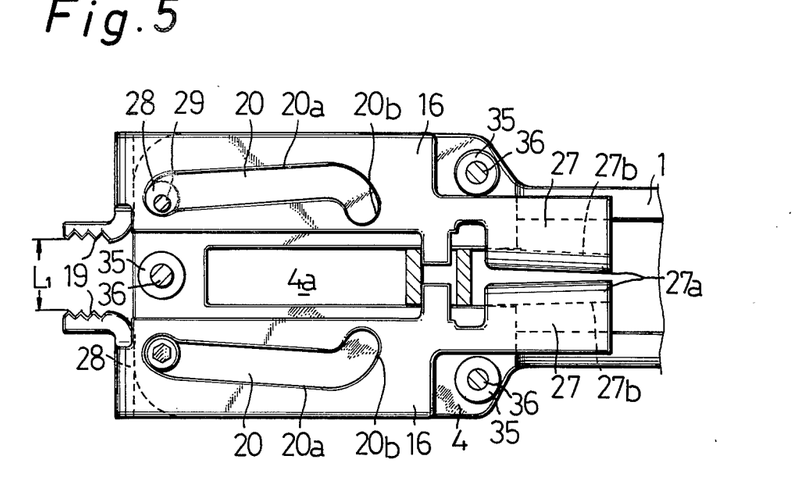

As shown in FIG. 5, the pair of opposing sliders 16 and 16 are formed with cam grooves 20 and 20, respectively, the straight base line portions 20a and 20a thereof being spaced apart by a progressively increasing distance rearward. The rearmost ends of the base line portions 20a and 20a are curved toward each other to provide recesses 20b and 20b which are spaced by the smallest distance.

At intermediate portions of the sliders 16 and 16 close to the rear end thereof, there are provided pins 22 and 22 pivotally supporting a connecting piece 21a at the base end of a gripping lever 21 which piece extends into the guide groove 4a. The opposite sides of the connecting piece 21a are guided by the opposing side surfaces of the guide grooves 4a and 17a in sliding contact therewith. The free end of the gripping lever 21 extends rearward in opposing relation to the stationary grip 1. A support rod 25 is pivoted at its opposite ends to an intermediate portion of the lever 21 and to an intermediate portion of the stationary grip 1 by pins 23 and 24 respectively, the gripping lever 21 thus being tiltably supported by the rod 25. A return spring 26 is wound around the pin 24 and has one end bearing against the stationary grip 1 and the other end, against the support rod 25. The gripping lever 21 is therefore held in position by the action of the spring 26. The rear ends of the sliders 16 and 16 are bent into the guide groove 4a to provide opposing guide pieces 27 and 27. As seen in FIG. 5, the opposing outer surfaces 27a and 27a of the guide pieces 17 and 27 are spaced apart by an increasing distance toward the front so as to permit the sliders 16 and 16 to reduce the distance between the opposing jaws 19 and 19 as they slide along forward by being guided by the sliding contact of the outer surfaces 27b and 27b of the guide pieces 27 and 27 with the surfaces defining the guide groove 4a.

Figure 6:
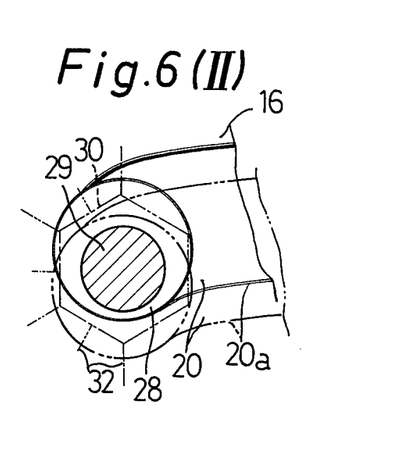
Figure 6I:
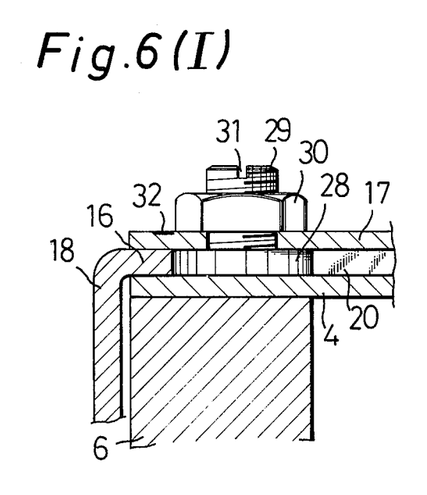
FIGS. 6(I) and (II) are a plan view and a sectional view, respectively, showing means for adjusting the space between the opposing jaws to prevent slippage of the same.

One of guide members 28 engaged in the cam grooves 20 is mounted on the upper plate 4, with the other guide member 28 attached to the under surface of lever guide plate 17. According to a preferred embodiment of this invention, the guide member 28 provided on the lever guide plate 17 is eccentrically secured to the lower end of a screw rod 29 as shown in FIGS. 6(I) and (II), the screw rod 29 extending through and projecting upward from the lever guide plate 17 to carry a lock not 30 screwed thereon. A groove 31 is formed in the upper end of the projection. The lock nut 30 is hexagonal, and graduations 32 are marked in the surface of the guide plate 17 in opposing relation to the corners of the nut 30. Accordingly, for the fine adjustment of the space $L_1$ between the opposing gripping jaws 19 and 19, the lock nut 30 is loosened, the screw rod 29 is turned by a driver fitted in the groove 31 to vary the amount of eccentricity of the guide member 28 and the nut 30 is fastened again. The adjustment thus effected serves to prevent the possible slippage of the gripping jaws 19 and 19 that will occur as the sliders 16 and 16 including the gripping jaws 19 and 19 are moved forward when the sheath of the covered wire W, mostly made of vinyl chloride, gets softened.

Before stripping operation is initiated, the downwardly extending portions 18 and 18 of the sliders 16 and 16 are in contact with the front plate 6, with the guiding members 28 and 28 located in the front portions of the cam grooves 20 and 20. In this state, the gripping jaws 19 and 19 are held spaced apart by a distance $L_1$ permitting passage of the covered wire W.

The covered wire W is inserted through the bore 8 rearward to open the cutter members 10 and 10 against the spring member 15 and to bring the same to the stripping position as shown in FIG. 7(I).

Figure 1:
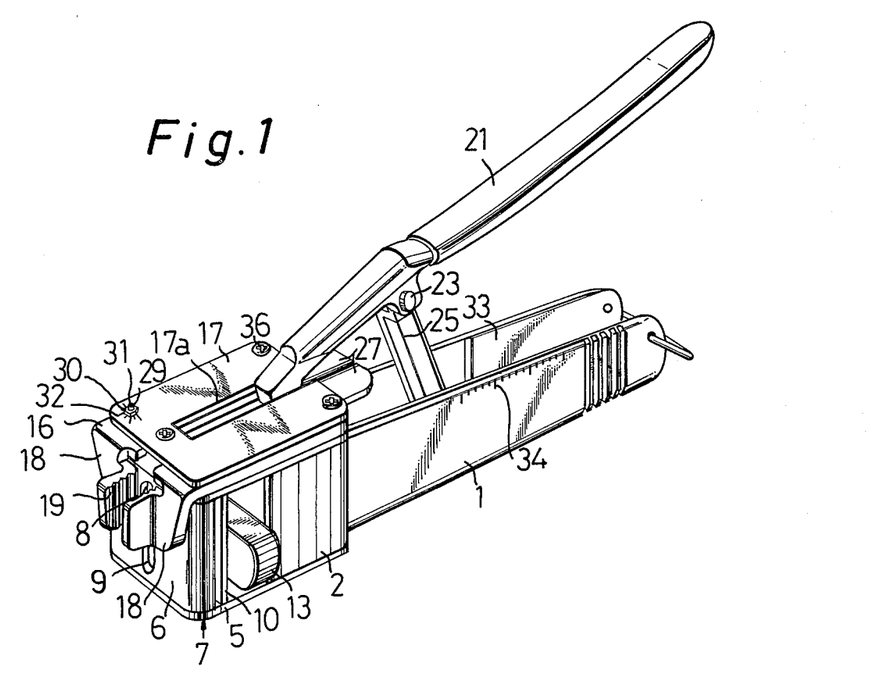
FIG. 1 is a perspective view showing the appearance of a stripper of this invention in its entirety.
Figure 2:
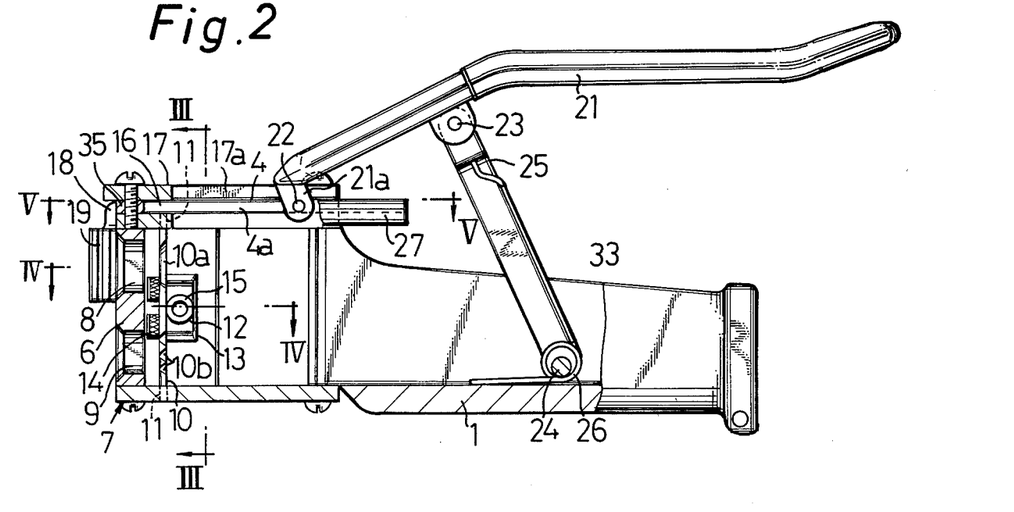
FIG. 2 is a side elevation in section.
Figure 3:
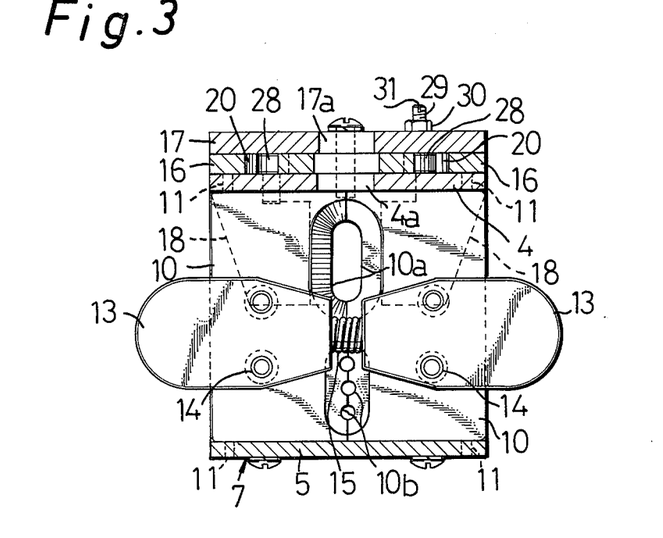
FIG. 3 is an enlarged view in section taken along the line III—III in FIG. 2.

The amount of insertion of the covered wire W, namely the length of sheath to be removed can be measured by a scale 34 provided on the edge of opening 33 of the stationary grip 1 as seen in FIG. 1. The amount of insertion of the wire can be adjusted by manipulating the holder block 13 and with reference to the scale 34.

The gripping lever 21 is then pushed toward the stationary grip 1 by grasping, causing the sliders 16 and 16 to move forward away from the cutter members 10 and 10, inasmuch as the connecting piece 21a of the lever 21 is pivoted to the sliders 16 and 16 by the pins 22 and 22.

During the above-mentioned forward movement, the sliders 16 and 16 are prevented from vertical displacement by the upper plate 4 and lever guide plate 17. Further to assure smooth forward movement of the sliders 16 and 16, three spacers 35 are interposed between the upper plate 4 and the lever guide plate 17 on the rear opposite sides of the sliders and at a front position centrallly thereof as seen in FIG. 5, the spacers 35 being secured by screws 36.

As the gripping lever 21 is pushed further toward the grip 1, the sliders 16 and 16 advance, reducing the space between the opposing gripping jaws 19 and 19, since the guide members 28 and 28 are held in sliding contact with the straight base line portions 20a and 20a of the cam grooves 20 and 20 which portions are spaced apart by a progressively increasing distance rearward. Consequently, the jaws grip the covered wire W in front of the front plate 6, pulling the covered wire W forward. This pivotally moves the cutter members 10 and 10 backward in the closing direction about their pivots 11 and 11 without deviation, wedging the cutter edges 10a and 10a gradually into the sheath while entailing an increasing stripping resistance. The cam base line portions 20a and 20a spaced apart by an increasing distance to the rear serve to augment the gripping force of the jaws 19 and 19 with the increase in the stripping resistance.

Figure 8:
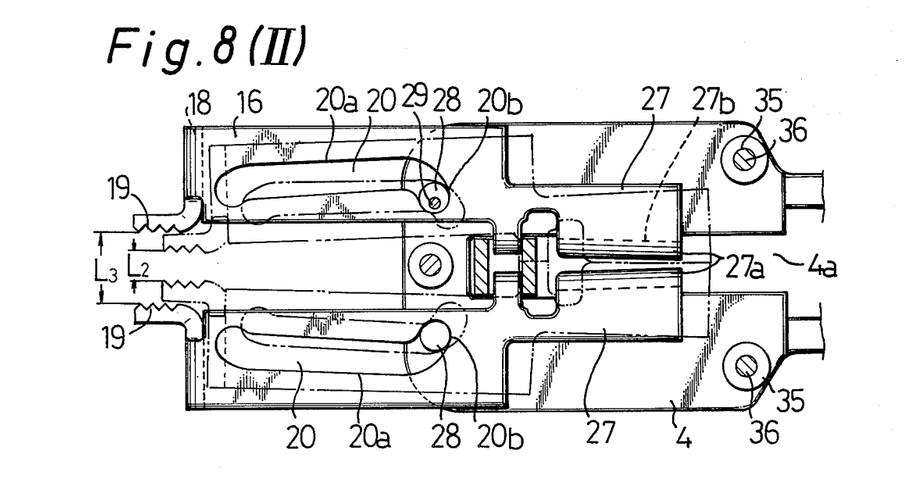
Figure 8I:
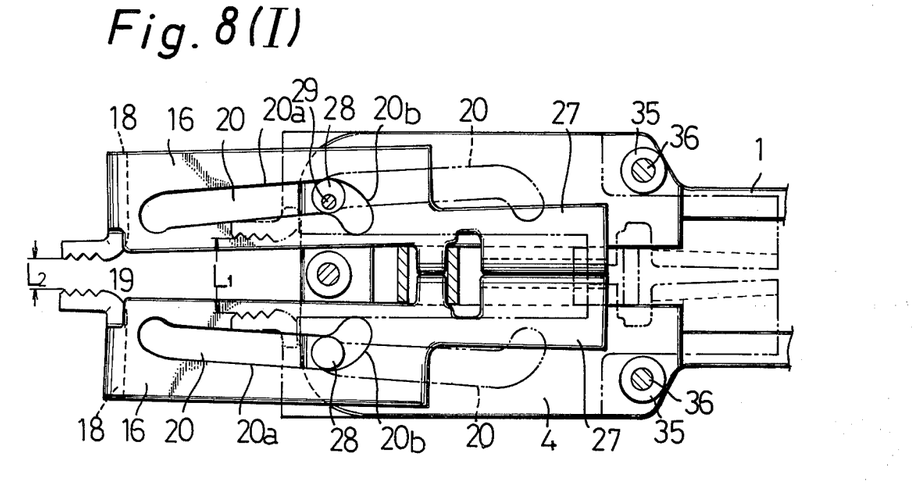
FIGS. 8(I) and (II) are views showing the sliding movement of the gripping jaws.

The advance of the sliders 16 and 16 brings the approximate terminal ends of the base line portions 20a and 20a into contact with the guide members 28 and 28, giving the smallest distance $L_2$ between the opposing gripping jaws 19 and 19 as illustrated in FIG. 8(I) to enable the jaws to grip the covered wire W firmly. At this time, the cutter members 10 and 10 are in slignment with each other as shown in FIG. 4 to completely cut the sheath. Subsequently, the gripping lever 21 is further grasped, slightly advancing the sliders 16 and 16, which in turn pivotally move the cutter members 16 and 16 to inclined position as seen in FIG. 7(II), causing the cutter members 16 and 16 to bear against the front plate 6. At the same time, the guide members 28 and 28 fit into the recesses 20b and 20b of the cam grooves 20 and 20, whereupon the distance between the opposing jaws 19 and 19 increases to $L_3$. As a result, the covered wire W is freed from the gripping force. The stripper main body is thereafter withdrawn, with the result that the predetermined length of severed sheath is removed from the insulation with its cut end supported by the back surfaces of the cutter members 10 and 10 as already described. The removed piece of sheath is contained in the opening 36 of the stationary grip 1.

The parts are returned to the original positions by the restoring forces of the spring member 15 and return spring 26 and by removal of the grasping force and are made ready for the next operation. The severed piece of sheath removed is taken out from the opening 33 of the stationary grip 1.

To remove the insulation, the insulated wire is inserted into the stripper through the bore 9, and the same procedure as above is followed. In the case where the insulated conductor is not rigid enough to push open the cutter members 10 and 10 against the spring member 15, the holder block 13 will be manipulated to pivotally open the cutter members 10 and 10. The insulation is removed by the edges 10b and 10b of the cutter members 10 and 10 to expose a length of conductor as desired for connection.

The objects of this invention can be fully achieved by the construction described above. The invention is not limited to the foregoing construction but it is to be understood that modifications and alterations can be made without departing the scope of the invention as defined in the appended claims.

For example, the edges of the cutter members may be modified in conformity with the shape of covered wire to be stripped, the gripping jaws of the sliders may be made serviceable for both the wire inserting bores, the cams of the cam grooves may be otherwise modified in shape, the guide members for adjusting the space between the gripping jaws may be adapted to serve also as spacers, and both the guide members may be in the form of eccentric cam.

What is claimed is:

1. A stripper for stripping covering from covered wire comprising:
   a cutter head including a front plate formed with at least one inserting bore for passing the covered wire;
   a pair of cutter members each attached to a holder block and having cutter edges behind the inserting bore and arranged in the cutter head symmetrically on the opposite sides of the covered wire to be inserted therein, the pair of cutter members being pivotally movable and openable from aligned position toward the direction of insertion of the wire; and
   a spring member retained on and interconnecting the holder blocks to render the holder blocks and cutter members pivotally movable along paths symmetrical with respect to the wire and to urge the cutter members in closing direction when they are moved pivotally backward in the closing direction, at least one of said holder blocks projecting from the cutter head.

2. The stripper as set forth in claim 1 wherein after the cutter members have been pivotally moved backward in the closing direction into alignment with each other, the cutter members are further pivotally movable in the same direction to inclined position to bear against the rear surface of the front plate.

3. A stripper for stripping covering from covered wire comprising:
   A cover head including a front plate formed with at least one inserting bore for passing the covered wire;
   a pair of cutter members each attached to a holder block and having cutter edges behind the inserting bore and arranged in the cutter head symmetrically on the opposite sides of the covered wire to be inserted therein, the pair of cutter members being pivotally movable and openable from aligned position toward the direction of insertion of the wire;
   a spring member retained on and interconnecting holder blocks to render the cutter members pivotally movable along paths symmetrical with respect to the wire and to urge the cutter members in closing direction when they are moved pivotally backward in the closing direction, at least one of said holder blocks projecting from the cutter head;
   a stationary grip of U-shaped cross section extending rearward from the cutter head and provided with a scale on an edge of its opening, and further including sliders disposed on a side of the wall cutter head and slidable along the wire by a gripping lever provided in opposing relation to the stationary grip, a pair of gripping jaws attached to the sliders respectively and opposing each other to permit passage of the wire therebetween and to grip the wire forwardly of the front plate and means for reducing the space between the opposing gripping jaws to cause the jaws to grip the wire when the sliders advance while moving the jaws away from the cutter members at the same time to pull the wire.

4. The stripper as set forth in claim 3 wherein the distance between the jaws is increased immediately before an extremity of stroke of the gripping jaws to free the wire from gripping engagement with the jaws.

5. The stripper as set forth in claim 3 further including means for previously adjusting the space between the opposing gripping jaws, the adjusting means comprising an eccentric guide member, a screw rod and a lock nut.

* * * * *